United States Patent
Sydänmaa et al.

(10) Patent No.: US 6,687,670 B2
(45) Date of Patent: *Feb. 3, 2004

(54) ERROR CONCEALMENT IN DIGITAL AUDIO RECEIVER

(75) Inventors: Matti Sydänmaa, Tampere (FI); Mauri Väänänen, Tampere (FI); Aki Mäkivirta, Lapinlahti (FI)

(73) Assignee: Nokia OYJ, Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 50 days.

(21) Appl. No.: 09/269,376
(22) PCT Filed: Sep. 26, 1997
(86) PCT No.: PCT/FI97/00581
§ 371 (c)(1), (2), (4) Date: Jun. 16, 1999
(87) PCT Pub. No.: WO98/13965
PCT Pub. Date: Apr. 2, 1998

(65) Prior Publication Data
US 2002/0147590 A1 Oct. 10, 2002

(30) Foreign Application Priority Data
Sep. 27, 1996 (FI) ................................. 963870

(51) Int. Cl.⁷ ............................................. G01L 21/02
(52) U.S. Cl. ....................... 704/226; 704/228; 704/229
(58) Field of Search .............................. 704/226, 227, 704/228, 229, 500, 503

(56) References Cited

U.S. PATENT DOCUMENTS

| | | | | |
|---|---|---|---|---|
| 5,148,487 A | | 9/1992 | Nagai et al. .................. 381/46 |
| 5,305,332 A | * | 4/1994 | Ozawa ....................... 714/747 |
| 5,473,727 A | * | 12/1995 | Nishiguchi et al. ......... 704/222 |
| 5,644,310 A | * | 7/1997 | Laczko, Sr. et al. ........ 341/143 |
| 5,673,363 A | * | 9/1997 | Jeon et al. .................. 704/270 |
| 5,706,396 A | * | 1/1998 | Schroder et al. ............ 704/228 |
| 5,852,805 A | * | 12/1998 | Hiratsuka et al. ........... 704/500 |
| 6,085,158 A | * | 7/2000 | Naka et al. ................. 704/228 |

FOREIGN PATENT DOCUMENTS

| | | |
|---|---|---|
| DE | 4135070 C1 | 5/1993 |
| DE | 4219400 A1 | 12/1993 |
| DE | 4234603 A1 | 4/1994 |
| EP | 0703712 A2 | 3/1996 |
| EP | 0718982 A2 | 6/1996 |
| EP | 0746116 A2 | 12/1996 |

OTHER PUBLICATIONS

Finnish Office Action.

PCT International Search Report.

* cited by examiner

Primary Examiner—Tālivaldis Ivar Šmits
Assistant Examiner—Abul K. Azad
(74) Attorney, Agent, or Firm—Perman & Green, LLP

(57) ABSTRACT

A digital audio receiver stores received frames temporarily for decoding and error concealment. A reconstructing block (14) in the decoder reads stored frames using a read window (43) wherein the latest received frame (+cnnxt) is undecoded. Decoding is carried out in stages so that the correctness of the current frame (0) is examined and possible errors are concealed using corresponding data of other frames in the window. Detection of errors is based on checksums (19, 26) and allowed values of bit combinations in certain parts of the frame. In addition, the receiver maintains an estimate (60) for the signal's bit error ratio and uses it to control the operation of the error concealment algorithm.

16 Claims, 6 Drawing Sheets

ERROR CONCEALMENT IN DIGITAL AUDIO RECEIVER

The invention relates in general to detection and concealment of errors in a signal transmitted in digital form from a transmitter to a receiver. In particular the invention relates to detection and concealment of transmission errors in an audio signal processed in the form of frames by a digital audio receiver.

Transmission of an audio signal in digital form from a transmitter to a receiver is known as such and it is going be become more common as digital television and broadcasting systems replace older systems based on analog frequency modulation. Known telecommunications standards dealing with the transmission of digital audio signals include the ETS 300 401 standard by the European Broadcasting Union (EBU) and European Telecommunications Standards Institute (ETSI) and the ISO/IEC 11172-3 and ISO/IEC 13818-3 standards by the International Standard Organization (ISO) and International Electrotechnical Commission (IEC). These standards specify a certain frame structure for the transmission of a digital audio signal. The ETS 300 401 standard, which is also called the DAB (Digital Audio Broadcasting) standard, specifies a frame structure which in a way is a special case of the frame structure specified in the ISO/IEC 11172-3 and ISO/IEC 13818-3 standards as it contains additional specifications concerning frame structure particulars left open in the earlier standards. With an audio signal sampling frequency of 48 kHz the DAB standard is based on the ISO/IEC 11172-3 standard and with a sampling frequency of 24 kHz on the ISO/IEC 13818-3 standard. To illustrate the background of the invention, the structure of the audio frame according to the aforementioned standards and its processing in transmitter and receiver apparatuses is described in brief below.

Figure 1:
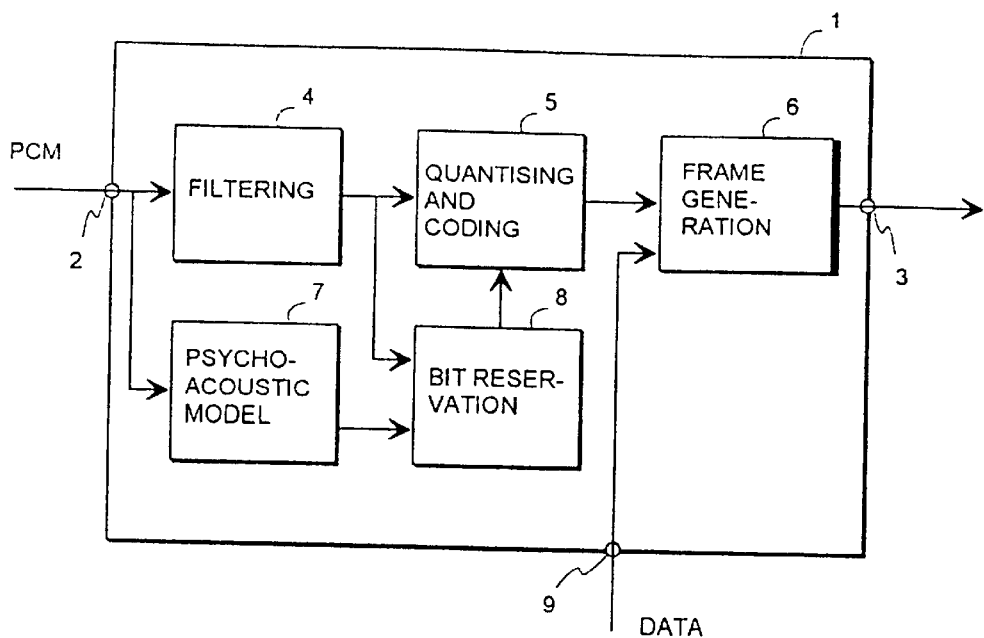

FIG. 1 is a simplified block diagram of an apparatus 1 according to the ISO/IEC 11172-3 and 13818-3 Layer II standards generating DAB frames from a pulse-code-modulated (PCM) audio signal. The apparatus comprises an input port 2, output port 3, and between them, a filter bank 4, quantising and coding block 5, and a frame generating block 6, connected in series. In parallel with the filter bank 4, there is a psychoacoustic model block 7 the input signal of which is the same as the filter bank input signal. The outputs of blocks 4 and 7 are taken to a bit allocation block 8 the output of which controls quantising and coding in block 5. The apparatus also comprises a data port 9 such that digital program associated data brought thereto is taken to the frame generating block 6 which incorporates the program associated data in the frame structure.

Figure 2:
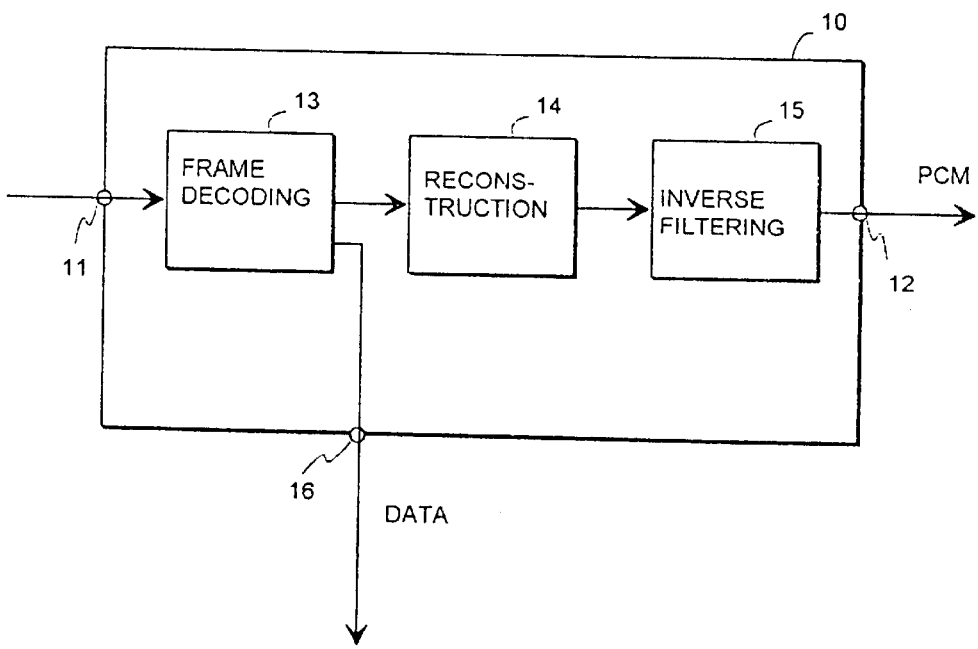

FIG. 2 is a simplified block diagram of an apparatus 10 according to the ISO/IEC 11172-3 and 13818-3 Layer II standards decoding the frames generated by the transmitter shown in FIG. 1 into a pulse-code-modulated audio signal. It comprises an input port 11, output port 12, and between them, a frame decoding block 13, reconstructing block 14 and an inverse filter bank 15, connected in series. The frame decoding block 13 is also connected with a data port 16 to take program associated data to other circuits of the receiver apparatus.

The audio signal is transmitted as frames between apparatuses according to FIGS. 1 and 2. The amount of data in a single frame corresponds to a 24- or 48-ms-long audio signal part. In addition to audio data proper the frame contains header information, checksums, information related to the processing of audio data, and program associated data, PAD. Since transmission paths are not ideal, errors may occur in the contents of the frames which affect the operation of the receiver in different ways depending on the location of the error in the frame.

Figure 3:
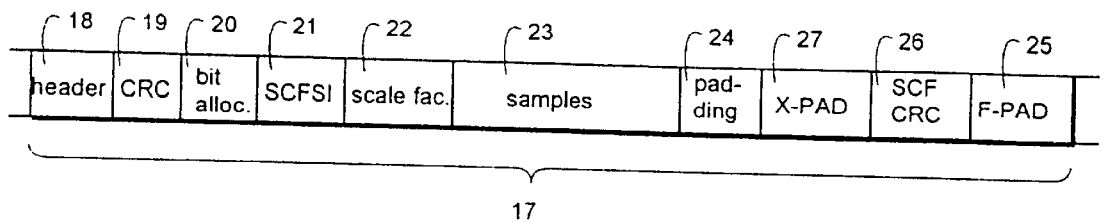

FIG. 3 shows the structure of an audio frame 17 according to the DAB standard. The frame comprises an integer number of eight-bit bytes (not shown). It starts with a 32-bit header 18, followed by a 16-bit CRC word 19. The length of the bit allocation part 20 is 26 to 176 bits depending on the audio mode (single channel, dual channel, stereo, joint stereo) and sampling frequency used as well as on the bit rate used for transmitting the audio program. An SCFSI part contains instructions for the interpretation of the scale factor part 22 following it. The scale factors in the latter provide information about how the various parts of the signal were emphasised at the frame generation stage. Each scale factor is represented by a six-bit codeword (not shown) and the number of codewords in the frame varies according to how much variation there is in the different parts of the audio signal during the period represented by the frame. Part 23 contains the sampled values proper which represent the sampled audio signal. If the bits representing the sampled values do not fill the length of the space reserved for them, the empty part is filled with padding bits 24.

There are in the end of the frame 17, from right to left in the Figure, a fixed program associated data (F-PAD) field 25, scale factor cyclic redundancy check (SCF CRC) error protection 26 for the audio data, and an extended program associated data (X-PAD) field 27. The latter is not necessarily included in every audio frame. In accordance with the ETS 300 401 standard, the program associated data fields 25 and 27 are intended for the transmission of data that are closely related to the audio data proper included in the frame and that may have synchronisation requirements concerning the audio data. Their use is not mandatory. The F-PAD and X-PAD fields together form the program associated data (PAD) part. The F-PAD field particularly includes a two-bit X-PAD indicator (not shown) to indicate whether the frame includes an X-PAD field and if so, whether it is a four-byte, so-called short X-PAD field or a variable size X-PAD field.

Figure 4:
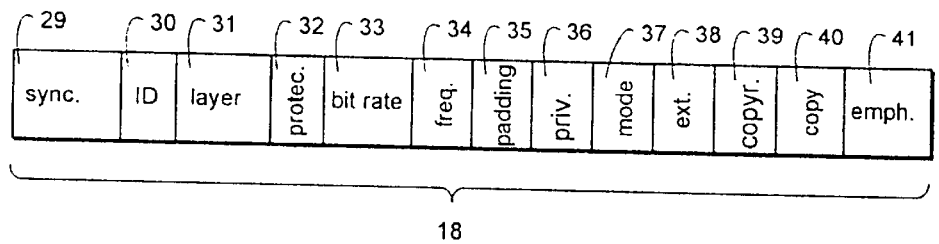

FIG. 4 shows in more detail an audio frame header 18 the length of which is 32 bits (four bytes). The description to follow concerns both the ISO/IEC 11172-3 and ISO/IEC 13818-3 standards and the DAB standard so that the specifications required by the DAB standard are mentioned separately. The first twelve bits form a synchronisation word 29 in which all bits are ones. The next bit 30 is a so-called ID bit wherein value "1" corresponds to the application of the ISO/IEC 11172-3 standard and value "0" corresponds to the application of the ISO/IEC DIS 13818-3 standard in the audio signal processing. The length of the Layer field 31 is two bits and its value corresponds to the layer of the ISO/IEC 11172-3 standard in use. The DAB standard allows values "10" (Layer II) and "00" (reserved for future expansion). The protection bit 32 indicates whether there is a checksum in the frame, and its value according to the DAB standard is "0", meaning a checksum is used. The next four-bit field 33 represents the bit rate of the audio program in use. The ISO/IEC 11172-3 and ISO/IEC 13818-3 standards do not allow the value "1111" in the field 33. Furthermore, the DAB standard does not allow the value "0000". The sampling frequency field 34 includes two bits representing the sampling frequency of the original pulse-code-modulated signal. According to the DAB standard, values "00" and "01" are not allowed in this field 34. Value "01" corresponds to a 48-kHz sampling frequency if the ID bit is "1", and to a 24-kHz sampling frequency if the ID bit is "0". Value "11" is reserved for future expansion. A padding indicator bit 35 is "0" according to the DAB standard because there are no padding bits in the audio frame formed from a 48-kHz or 24-kHz PCM signal. According to the ISO/IEC 11172-3 and ISO/IEC 13818-3 standards, bit 35 is "1" if there are padding bits in the audio frame. The Private bit 36, which is reserved for private use, has no significance according to the DAB, ISO/IEC 11172-3 and ISO/IEC 13818-3 standards.

A two-bit field 37 indicates the audio program's transmission mode which can be stereo ("00"), joint stereo ("01"), dual channel ("10") or single channel ("11"). The joint stereo mode in accordance with the DAB standard is also known as "intensity stereo". At sampling frequency of 48 kHz, the values of fields 37 and 33 correlate such that only the following combinations are allowed:

| bit rate (kbit/s) | modes allowed | field 33 value | field 37 value |
|---|---|---|---|
| 32, 48, 56, 80 | single channel | "0001", "0010", "0011", "0101" | "11" |
| 224, 256, 320, 384 | stereo, joint stereo, dual channel | "1011", "1100", "1101", "1110" | "00", "01", "10" |
| 64, 96, 112, 128, 160, 192 | all modes | "0100", "0110", "0111", "1000", "1001", "1010" | all values |

At the sampling frequency of 24 kHz, all modes are allowed at all bit rates specified for 24 kHz.

The mode field extension 38, the length of which is two bits as well, is significant according to the DAB standard only if the mode field value is "01", i.e. the joint stereo mode is in use. Then the value of the extension field 38 indicates according. to a certain table which of the 32 subbands of the signal are in the intensity stereo mode. The following copyright bit 39 is "0" if the audio program transmitted is not copyright protected, and "1" if the program is covered by copyright protection. Value "1" of the copy bit 40 indicates that the program transmitted is an original recording and value "0" indicates that the program is a copy. The value of the emphasis field 41 corresponds according to the ISO/IEC 11172-3 standard to the emphasis used in the coding of the program. The DAB standard does not allow emphasis, so according to the DAB standard, the value of the field 41 is always "00".

For the processing of samples and generation of frames, the ISO/IEC 11172-3 or ISO/IEC 13818-3 encoder uniformly divides the original pulse-code-modulated signal into 32 subbands (cf. filter bank 4 in FIG. 1). For one frame, the encoder reads 36 samples from each subband and arranges them into three 12-sample groups. For each group the encoder determines a scale factor, or a coefficient for normalising the subbands for transmission. The mutual relationship of the magnitude of the group scale factors determines whether the encoder includes all three scale factors in the frame to be transmitted or whether it utilises the (near) identicalness of the scale factors by including in the frame only one or two scale factors. The number of scale factors per particular subband is represented by a subband specific SCFSI parameter, to which a reference was made above in the description of FIG. 3. For each scale factor there is in the frame scale factor part a six-bit codeword, allowing values "000000" through "111110".

The encoder of the transmitting apparatus continually monitors the frequency spectrum of the audio signal encoded and compares it with a so-called psychoacoustic model on the basis of which it divides the limited number of bits coming to each frame among the subbands. This so-called bit allocation procedure reserves the most bits for those parts of the signal that are the most important for the auditory impression. The same procedure determines the number of quantising levels for each subband. The least significant subbands are allocated no bits at all in the frame, so their number of quantising levels is zero. On other subbands, allowed numbers of quantising levels comprise 16 integers. At the sampling frequency of 48 kHz, the smallest number is 0 and the greatest, 65,535, except for the slow bit rate (32 or 48 kbit/s) modes where the maximum number of levels on the two most significant subbands is 32,767 and on the following six subbands, 127. In the slow bit rate modes, the frame includes the samples of only the eight most significant subbands (subbands 0 to 7). In other modes, the frame includes the samples of the 27 most significant subbands (subbands 0 to 26). At the sampling frequency of 24 kHz, the maximum number of quantising levels is for the four first subbands 16,383, on the next seven subbands, 127, and on the following nineteen subbands, 9, and on the two least significant subbands, 0.

To encode the samples, each sample is divided by the scale factor associated with it and a codeword is formed from the result according to a mapping operation defined in the standards. Each codeword comprises at least 3 and at most 16 bits, depending on the number of quantising levels. On subbands to which the bit allocation procedure assigned three, five or nine quantising levels, three successive samples constitute a granule, represented by a common codeword. Its maximum allowed value in the case of three quantising levels is 26, in the case of five quantising levels 124, and in the case of nine quantising levels 728. The mapping operation used in the codeword generation is chosen such that the codeword cannot comprise ones only. This is to prevent the mixing up in the receiving apparatus of codewords and the synchronisation word "1111 1111 1111" located in the beginning of the frame.

In the digital transmission of audio signal according to the prior art, detection of errors and the resulting error concealment attempts are based on the use of check-sums. In accordance with the above, the audio frame according to the ISO/IEC 11172-3 and ISO/IEC 13818-3 standards has one checksum field (reference designator 19 in FIG. 3) and the audio frame according to the DAB standard has additionally a second checksum field (reference designator 26 in FIG. 3). The former is a 16-bit CRC checksum covering the third and fourth bytes in the frame header as well as the bit allocation part (reference designator 20 in FIG. 3) and the SCFSI part (reference designator 21 in FIG. 3). The polynomial generating the CRC checksum is $G_1(X)=X^{16}+X^{15}+X^2+1$. The receiver uses the same polynomial to calculate the CRC checksum for the bits of the aforementioned coverage area and if it does not equal the checksum in the received frame, a transmission error is detected in the frame.

According to the DAB standard, the second checksum field in the end of the frame covers the most significant bits of the scale factors. At a sampling frequency of 48 kHz, modes in which the channel specific bit rate is at least 56 kbit/s (corresponds to an overall bit rate of at least 56 kbit/s in the single channel mode and at least 112 kbit/s in the other modes) have the scale factors protected by four separate CRC checksums the first of which (ScF-CRC0) covers subbands 0 through 3, the second (ScF-CRC1), subbands from 4 to 7, the third (ScF-CRC2), subbands from 8 to 15, and the fourth of which (ScF-CRC3) covers subbands 16 through 26. In modes where the channel specific bit rate is below 56 kbit/s, the scale factors are protected by two CRC checksums, the first (ScF-CRC0) covering subbands 0 to 3 and the second (ScF-CRC1 1) covering subbands 4 to 7. At the sampling frequency of 24 kHz, the scale factors are always protected by four separate CRC checksums the first of which (ScF-CRC0) covers subbands 0 through 3, the second (ScF-CRC1), subbands from 4 to 7, the third (ScF-CRC2), subbands from 8 to 15, and the fourth of which (ScF-CRC3) covers subbands 16 through 29. Lest the positions of the first and second checksums be changed according to the bit rate, the checksums are located in field 26 of FIG. 3 in reverse order, i.e. in the case of the higher bit rate of 48 kHz and 24 kHz, checksum ScF-CRC3 is the first, reading from the beginning of the frame, and checksum ScF-CRC0 is the last, reading from the beginning of the frame. In the case of the lower bit rate of 48 kHz, checksum ScF-CRC1 is the first, reading from the beginning of the frame, and checksum ScF-CRC0 comes thereafter. The polynomial generating all the CRC checksums protecting the scale factors is $G_2(X)=X^8+X^4+X^3+X^2+1$ and each of them covers the three most significant bits of the scale factors according to the aforementioned grouping. The receiver uses the same polynomial to calculate the CRC checksums for the most significant bits of the scale factors and if any one of them does not equal the checksum in the received frame, a transmission error is detected in the frame.

The aforementioned standards ETS 300 410, ISO/IEC 11172-3 and ISO/IEC 13818-3 do not specify a mandatory model of operation according to which the receiver should respond to transmission errors it detects in received audio frames. However, various operating model alternatives are known from recommendatory parts of the standards and from other telecommunications technology. In digital mobile phone technology, where the voice signal is transmitted in frames, it is usual that a receiver will not reproduce an audio part conveyed by a frame that was detected erroneous but mutes the sound reproduction unit totally for a moment or replaces the rejected frame with noise. Another option is that instead of the erroneous frame the receiver re-plays the preceding error-free frame. Since, however, the audio technology according to this patent application aims at sound reproduction of substantially better quality than that of telephone technology, automatic muting or substitution of a whole frame would degrade the auditory impression too much.

Another disadvantage of the prior art is that checksums are not a 100% reliable method to detect all transmission errors. If several errors occur in one and the same frame, it is possible that their effect on the checksum is equal but in the opposite direction so that the checksum appears correct in spite of the errors in the frame.

An object of this invention is to provide a method and equipment with which detection and concealment of errors are performed in the reception of a digital audio signal more reliably than in the prior-art solutions. Another object of the invention is to provide a method and equipment suitable for digital audio reception with which the concealment of transmission errors distorts only a little the auditory impression of a reproduced sound.

The objects of the invention are achieved by observing in the decoding and error concealment units of the receiver several successive frames and arranging their decoding and the audio signal reconstruction in a suitable manner.

The method according to the invention is characterised that it comprises stages wherein
several successive frames are stored in memory,
one frame stored in memory is chosen as the current frame,
the current frame is examined for errors, and
errors detected in the current frame are concealed using the contents of other stored frames.

The invention is also directed to a decoding apparatus to realise the method according to the invention. The apparatus according to the invention is characterised in that the reconstructing block in it comprises
a table for the temporary storing of frames,
read and write means to write frames to said table and read frames from it in windows,
means for verifying the integrity of a frame included in the window read, and
means for replacing erroneous values in the current frame with values obtained from other frames in the window.

The method according to the invention aims at a balanced solution in which the optimal transmission error detection and concealment level is achieved using reasonable computing capacity. The receiver receives and stores several successive frames which, when stored, form a certain frame table. To read the table, the receiver uses a certain window the magnitude of which is an integer number of frames greater than zero and which covers at least the current frame. In a preferred embodiment, the window also covers at least one frame received prior to the current frame and at least one frame received after the current frame. Decoding of frames in the window area is performed in stages. The latest frame arriving in the window area is first decoded until its scale factors are found out. Then the receiver conceals possible errors found in the scale factors of the current frame. In the concealment, it utilises scale factors of other frames in the window area. Next, the receiver continues decoding the latest frame until its samples are dequantised but not yet scaled. After that, the receiver uses frames in the window area in order to conceal errors that it may have found in the unscaled samples of the current frame. Only then are the samples of the current frame scaled and by means of inverse filtering a PCM signal is generated, which is taken to the output port of the decoder.

Having processed one frame the receiver moves the observation window one frame forward with respect to the frame table, whereafter the frame decoding described above starts over again. The method according to the invention is very suitable for parallel processing as the reception of new frames, their storing in the frame table, detection and concealment of errors in the current frame, the inverse filtering of the corrected frame and writing to the output data flow can be separate, parallely functioning parts.

In the method according to the invention, detection of errors is based both on the use of checksums and on the use of so-called fundamental sets of allowed values.

The latter means that if the receiver detects in a certain part of a received frame a bit combination which is not a combination allowed for that part of the frame, as specified by the standards, it assumes that there is a transmission error in that particular part. For both the scale factors and samples, the receiver tries to replace the values assumed erroneous with correct values found in the nearest possible frame. Only in a situation where correct replacement values cannot be found in the whole observation window area is the total or partial muting of the reproduced signal used as a means to conceal the erroneous part.

Size of the observation window may in one preferred embodiment of the invention be a dynamically variable parameter so that the method is adapted to different conditions causing transmission errors. One way of estimating error conditions on a longer term than one frame is to maintain a continually updated error parameter that represents the bit error ratio (BER) of the received signal. The receiver may also use the error parameter value to make other decisions concerning decoding and error concealment. If the average error level is high, it may be more advantageous to process an uncorrectable error by muting a whole frame, whereas with a low average error level, muting one or a few subbands is a better solution.

Figure 5:
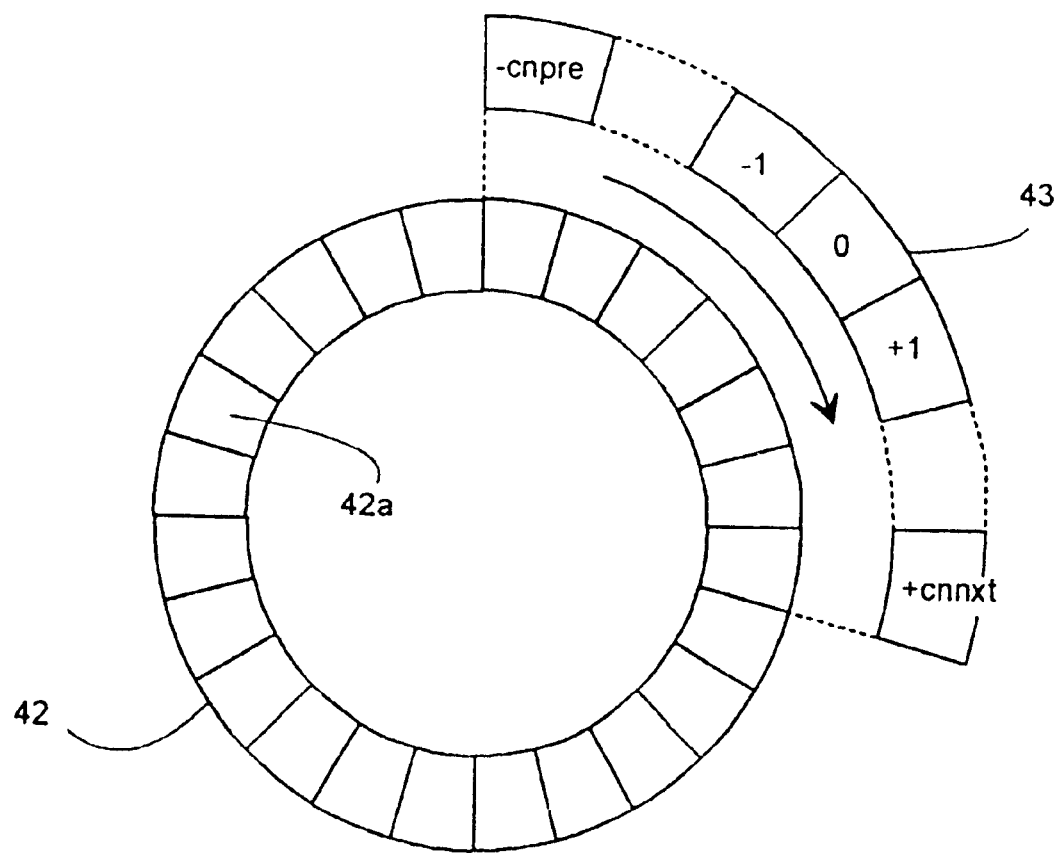
Figure 6:
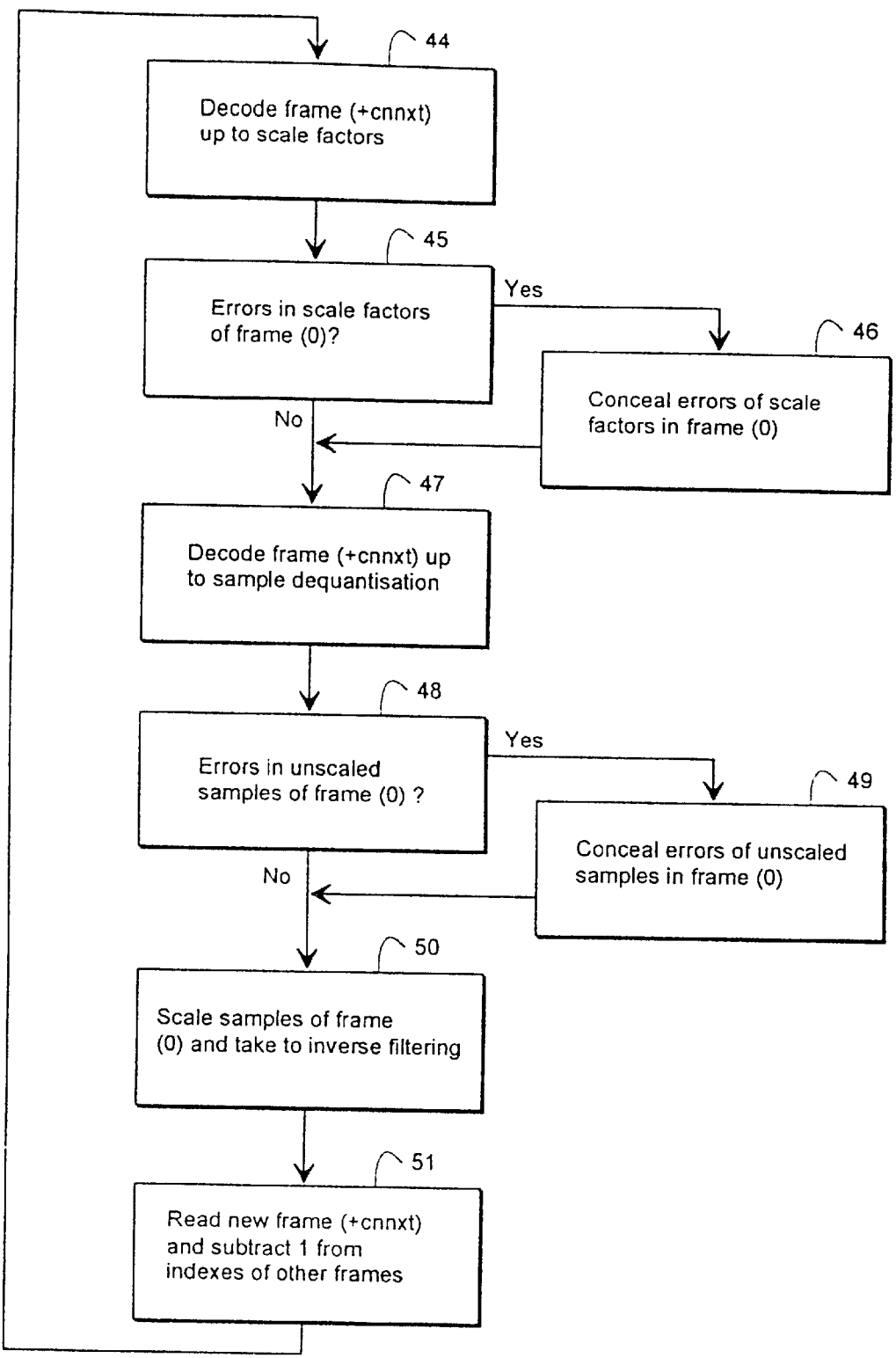
Figure 7:
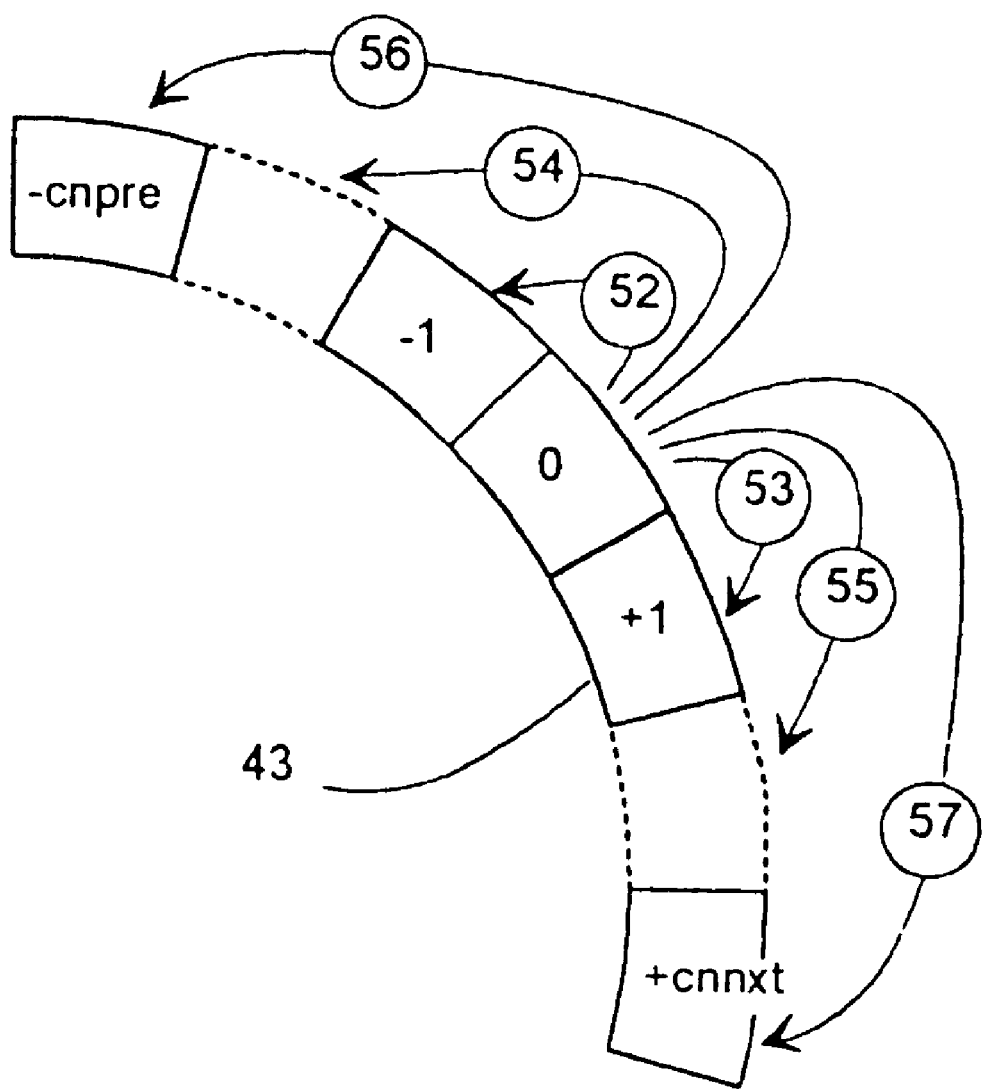
Figure 8:
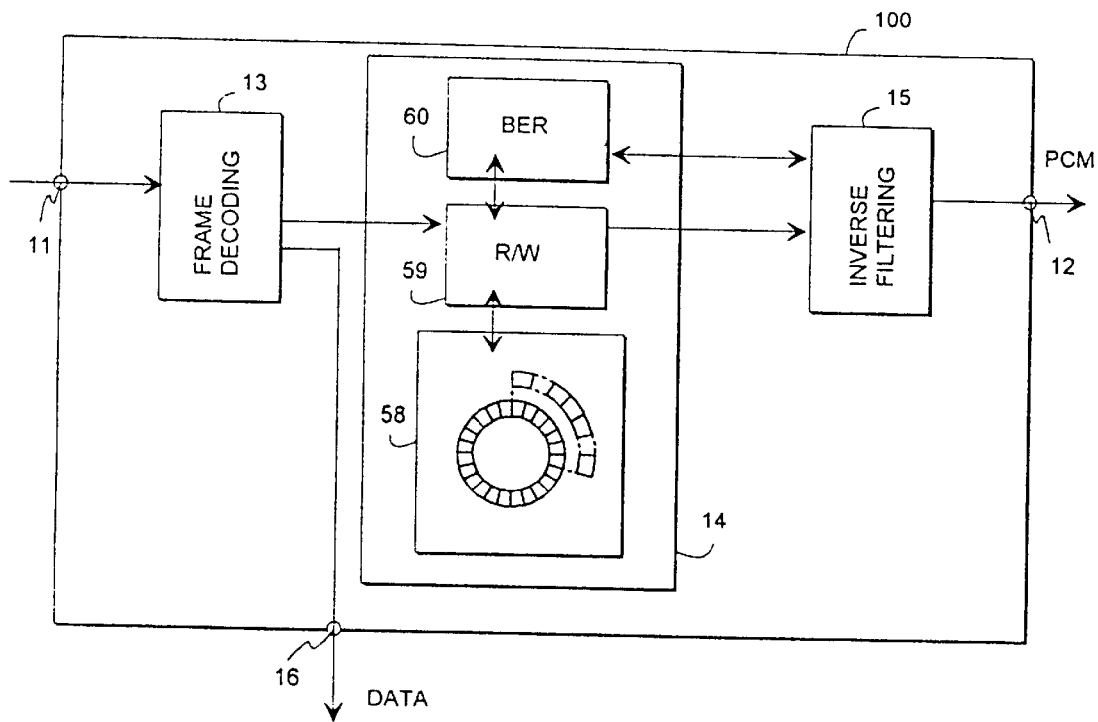

The invention is described in more detail with reference to the preferred embodiments presented by way of example and to the accompanying drawing wherein FIG. 1 shows a known encoder, FIG. 2 shows a known decoder, FIG. 3 shows a known digital audio frame, FIG. 4 shows a known header in the frame according to FIG. 3, FIG. 5 shows tabulation and windowing of audio frames according to the invention, FIG. 6 shows in the form of a flow diagram a detail of the method according to the invention, FIG. 7 shows the order of actions in a stage of the method according to the invention, and FIG. 8 shows the decoder according to the invention.

Above in conjunction with the description of the prior art reference was made to FIGS. 1 to 4, so below in the description of the invention and its preferred embodiments reference will be made mainly to FIGS. 5 through 8. Like elements in the Figures are denoted by like reference designators In the method according to the invention, the receiver uses the data contents of several successive frames to decode the frame being processed at a given time and to conceal the errors possibly detected in it. FIG. 5 shows a ring-like frame table 42. The shape of the table as such is of no concrete significance because in a preferred embodiment of the invention it only exists as a certain number of computer memory locations, but since so-called cyclic pointing is advantageously used for pointing to the one-frame blocks 42a in the table, it is illustrative to present the table in a ring-like form. Cyclic pointing means that a given block, having the address [k], is followed in the table by a block the address of which is [(k+1) mod NFRMS], where NFRMS is the number of blocks in the table. The receiver according to the invention initially stores each received frame in the table 42 according to FIG. 5 in the form which the frame has as it arrives at the input port of the decoder.

FIG. 5 also shows a window 43 used by the decoder of the receiver to decode the frames and to detect and conceal the transmission errors possibly occurring in them. Size of the window is an integer number of frames greater than zero. The index of the frame in the middle of the window, which identifies the frame within the window, is 0, and the frame is called the current frame. Those frames in the window that have been received and stored in the table 42 after the current frame are successor frames and the one farthest away from the current frame is the front frame. Those frames in the window that have been received and stored in the table 42 before the current frame are predecessor frames and the one farthest away from the current frame is the rear frame. The number of successor frames is marked cnnxt (from "current number of next frames") and the number of predecessor frames is marked cnpre (from "current number of previous frames"). The values of cnnxt and cnpre can change dynamically in a manner which will be described in more detail later on, but they must satisfy the double inequality $0 \leq (cnpre+cnnxt) < NFRMS$, for the size of the window 43 in frames (=cnpre+cnnxt+1) to be always at least 1 and not more than NFRMS. If the size of the window 43 is one frame, the names front frame, rear frame, and current frame all mean one and the same frame.

Frames in the window 43 are indexed in a manner which is independent of frame location in the table 42. The index of the current frame is 0, as was stated above. The indexes of successor frames are positive integers such that the index of the successor frame nearest to the current frame is 1, index of the next successor frame is 2 and so on; the index of the front frame is+cnnxt.

FIG. 6 shows in the form of a flow diagram a program loop intended for converting the audio data carried by the current frame into PCM format in as an error-free manner as possible. In the description below it should be especially noted that the operations are directed alternately to the different frames and to understand the description it is essential that the reader not mix up the frames with each other. The execution of the program loop starts in accordance with FIG. 6 with the receiver starting in step 44 to decode the front frame and continuing doing so until the scale factors of the front frame have been decoded. After that, the receiver checks in step 45 in a manner described later on whether there are transmission errors in the scale factors of the current frame and, if necessary, conceals them in step 46 using a method described later on. Then the receiver continues decoding the front frame in accordance with step 47 until the subband samples in it have been dequantised but not yet scaled by multiplying them by the scale factors included in the frame. Next, the receiver checks in step 48 in a manner described later on whether there are transmission errors in the subband samples of the current frame and, if necessary, conceals them in step 49 using a method described later on. Then the receiver carries out in step 50 the scaling of samples of the current frame in a known manner and directs the scaled samples to inverse filtering where a PCM signal is generated and taken further to the output port of the decoder. Finally, the receiver moves in accordance with step 51 the window forward by one table block (i.e. takes a new frame as front frame, subtracts one from the indexes of all the frames that were in the window already and drops the rear frame from the window) and starts the decoding again with the new front frame in step 44. Decoding continues as long as the receiver is in operation and new frames are being received and stored in the table 42.

The flow diagram in FIG. 6 does not imply that the method according to the invention could be carried out only as a series of temporally successive operations. If the receiver can perform several parallel processes simultaneously, the directing of a decoded current frame to inverse filtering and therefrom in PCM format to the decoder's output port can occur in parallel with the starting of a new decoding operation. Similarly, the storing of new frames in the table 42 outside the area covered by the window 43 and the removal of frames already dropped from the window 43 (in practice, the receiver overwrites the old frames in the memory with new ones) can occur at the same time that the frames in the window are being processed.

Size of the window 43 may change during the operation of the receiver as long as the size-limiting numbers cnnxt and cnpre do not violate the condition given above in the form of the double inequality. The number of successor frames is directly proportional to the decoding delay produced by the decoder. If for some reason it is desirable to increase the delay, the receiver can execute the program loop according to FIG. 6 in such a way that it leaves out the index subtraction operation according to step 51 until the desired delay is achieved. Then the current frame remains the same in each cycle and only a new front frame appears in the window which is one index further away from the current frame than the previous front frame (cnnxt increases). If it is desirable to decrease the delay (cnnxt decreases), the receiver can in step 51 subtract from the indexes of the frames in the window a number greater than 1 (to be precise, the number [1+(cnnxt$_{old}$-cnnxt$_{new}$)], where cnnxt$_{old}$ is the value of cnnxt before decreasing the delay, and cnnxt$_{new}$ is the value of cnnxt after decreasing the delay). Then the index of at least one frame jumps over zero, i.e. the frame in question never becomes the current frame. This may result in a passing distortion in the auditory impression of the sound reproduced, even though inverse filtering generally tends to reduce the effect of such distortions. The receiver may also move the rear boundary (the boundary at the rear frame side) of the window 43 forward (cnpre decreases) or backward (cnpre increases). This has no effect on the decoder delay.

Next it will be discussed how the receiver determines there is a transmission error in a frame. The ISO/IEC 11172-3 standard includes specifications for calculating a first CRC checksum concerning part of the audio frame header (cf. reference designator 19 in FIG. 3). In addition, the DAB standard includes specifications for calculating a second CRC checksum concerning the frame scale factors (cf. reference designator 26 in FIG. 3). Above it was discussed how the receiver uses checksums to detect errors. In the method according to the invention the receiver also verifies that certain frame elements contain values that are allowed according to the DAB and ISO/IEC 11172-3 and ISO/IEC 13818-3 standards. In the list below the checks are named as they appear in the standards in English. Some of the checks apply only to communications according to the DAB standard as the ISO/IEC 11172-3 and ISO/IEC 13818-3 standards do not define equivalent data structures. These checks, however, do not violate the ISO/IEC 11172-3 or ISO/IEC 13818-3 standard as they are directed to frame elements left unspecified in those standards.

SYNCWORD: if the value of the synchronisation word is other than "1111 1111 1111", there is a transmission error in the frame.

LAYER: layer codes "01" and "11" are not allowed in DAB communications, so their appearance indicates an error.

PROTECTION: in DAB communications, the protection bit has to be "0", so the value "1" indicates an error.

BIT RATE: according to the ISO/IEC 11172-3 and ISO/IEC 13818-3 standards, the value "1111" is not allowed; furthermore, the value "0000" is not allowed in the DAB standard.

SAMPLING FREQUENCY: according to the DAB standard, the sampling frequency values "00" and "10" are not allowed.

PADDING BIT: if the sampling frequency is 48 kHz or 24 kHz, the padding indicator bit has to be "0", otherwise it is erroneous.

MODE: sampling frequency, mode and bit rate combinations that are not included as allowed combinations in the table presented above in conjunction with the description of the prior art or in the ISO/IEC 13818-3 standard, indicate an error.

EMPHASIS: according to the DAB standard, the value of the emphasis field has to be "00"; other values indicate an error.

BIT ALLOCATION: the total number of bits reserved for the subbands cannot exceed the space reserved for those bits in the frame. The total number of bits depends on the bit rate. A conflict between the bit rate and the total number of reserved bits indicates an error.

ID BIT CHANGE: if the ID bit is changed without the decoder knowing about the change beforehand, the receiver interprets the change as an error.

BIT RATE CHANGE: if the bit rate is changed without the decoder knowing about the change beforehand, the receiver interprets the change as an error.

SAMPLING FREQUENCY CHANGE: if the sampling frequency is changed without the decoder knowing about the change beforehand, the receiver interprets the change as an error.

MODE CHANGE: if the audio mode is changed without the decoder knowing about the change beforehand, the receiver interprets the change as an error; however, a change between the stereo mode and joint stereo mode in the one direction or the other is not interpreted as an error.

LAYER CHANGE: if the layer is changed without the decoder knowing about the change beforehand, the receiver interprets the change as an error.

SCALE FACTOR INDEX: the scale factor index value "111111" is not allowed, so its appearance indicates an error.

SUBBAND SAMPLE CODEWORD: if NLEVELS refers to the quantising levels of a given subband and it is 3, sample codewords greater than 26 (decimal) are illegal. If NLEVELS is 5, codewords greater than 124 (decimal) are illegal. If NLEVELS is 9, codewords greater than 728 (decimal) are illegal. Otherwise, codewords comprising only ones are illegal.

PCM SAMPLE RANGE: there exist certain limits for the PCM signal generated at the inverse filtering. PCM pulses the absolute values of which exceed the maximum limit indicate an error. PCM pulses exceeding the limit are usually clipped to the maximum value before sound reproduction.

Some of the aforementioned syntax errors, or errors in which a value does not belong to the fundamental set of allowed values specified for that particular field, also result in an error detected by means of checksums. There are, however, situations in which a syntax error does not have a net effect on the checksum, so syntax checks make the detection of transmission errors more efficient.

Next it will be discussed the operation of the receiver in a situation in which it has detected a transmission error. Location of the error in the frame determines how severely it affects the decoding of the frame and the reproduction of the audio signal carried by the frame. If the error is in the area covered by the first checksum (error is indicated by calculation of the first checksum or by any one of the checks BIT RATE, SAMPLING FREQUENCY, PADDING BIT, MODE, EMPHASIS, BIT ALLOCATION, BIT RATE CHANGE, SAMPLING FREQUENCY CHANGE or MODE CHANGE) or if the check ID BIT CHANGE indicates the error, the whole frame has to be discarded. The second checksum field for the scale factors has, as described earlier, two or four checksums, each of which is directed to the scale factors of a certain subband group. If the calculation of any one of these checksums or the aforementioned SCALE FACTOR INDEX check indicates the error, the receiver according to the invention regards all scale factors in that particular group as unreliable.

Discarding the frame means that the sample values transmitted by the frame have to be replaced by error-free or at least less erroneous values. Similarly, interpreting a certain scale factor group unreliable means that those scale factors have to be replaced by better values. In the method according to the invention, better values are sought using the table and window arrangement described above as well as the operating procedure shown in FIG. 7. The receiver looks for better values first in the predecessor frame closest to the current frame in step 52. If no better values are found there, the receiver next searches the successor frame closest to the current frame in step 53. The search continues alternately in predecessor and successor frames (steps 54 and 55) until the receiver either finds better values or has searched the whole window (steps 56 and 57). The latter case means that no better values can be obtained from any frame in the window and the error is thus uncorrectable and the erroneous values have to be replaced by zeroes. If the error was in the scale factors, the use of zeroes mutes the corresponding subbands for the current frame. If the error was in the area covered by the first checksum, the whole frame has to be muted.

The error detection techniques described above, except for the ID BIT CHANGE check, are directed only to those parts of the frame that belong to the coverage area of the first or second checksum and/or for which there is a certain fundamental set of allowed values. In audio frames according to the ISO/IEC 11172-3 standard, the audio samples and all scale factors are unprotected. During transmission, errors may occur also in these parts of the frame, resulting in annoying distortion in the sound reproduced by the receiver. The present invention prepares also for errors occurring in the unprotected areas. In the solution according to the invention, the receiver continuously maintains an estimate of the mean bit error ratio (BER) of the received signal. The estimate may be a single parameter the value of which increases in proportion to the number of errors detected by the receiver in the latest processed frames. In a more versatile alternative the BER estimate may be a record comprising several fields such as the number of errors detected in N latest frames, where N is an integer; the time derivate of the bit error ratio, i.e. whether the ratio is increasing or decreasing; mutual ratios of successfully concealed and uncorrected errors, etc.

One way of using the BER estimate against errors occurring in the unprotected parts of the frames is e.g. such that if the BER estimate shows a generally high error level, the receiver will not allow sudden great changes in the values of scale factors or samples but interprets them as errors that should be concealed. But if the error level is generally low, the receiver will also reproduce sound elements conveyed by sudden changes. Furthermore, when the mean bit error ratio is high, it may be advantageous that even if the uncorrected error were in the scale factors, the receiver mute the whole frame and not only the subbands associated with said scale factors.

The method according to the invention can also make use of the fact that the receiver is usually arranged so as to clip PCM pulses the absolute values of which exceed a certain maximum value so that they then equal said maximum value. In a preferred embodiment of the method according to the invention the receiver counts how often the PCM pulses need to be clipped. If one frame produces in excess of a given threshold value PCM pulses that need to be clipped, the receiver may assume that the frame in question contains too much noise and it must be muted by replacing the PCM pulses with zero values. Said threshold value may depend on the BER estimate in a manner such that the higher the mean error level, the more readily the receiver assumes the frame erroneous, i.e. the lower said threshold value.

Now it will be discussed a digital audio receiver decoder according to the invention, for which FIG. 8 shows a block diagram in accordance with a preferred embodiment. The decoder 100 comprises, not unlike a decoder of the prior art, an input port 11, output port 12, frame decoding block 13, data port 16 and an inverse filter bank 15. The interfaces of a reconstructing block 14 to the frame decoding block and inverse filter bank comply with the ISO/IEC 11172-3 or ISO/IEC 138181-3 Layer II standard. The block includes a memory 58 which forms a table 42 according to FIG. 5. In addition, the reconstructing block includes a read and write element 59 which writes the new frames coming from the frame decoding block in the table, reads a windowful 43 of stored frames to be processed, and takes the decoded and scaled samples from each current frame to be directed to the inverse filter bank. In conjunction with the read and write element there is a bit error ratio computing block 60 which estimates the bit error ratio of the received signal and on the basis of that, controls the operation of the read and write element and, if necessary, the replacement with zeroes of the PCM samples in connection with the inverse filtering. The latter is carried out as described above if in conjunction with the inverse filtering it is detected too many exceedings of the maximum allowed pulse limit with respect to the bit error ratio.

In the decoder according to the invention, the necessary functions related to the use of memory to tabulate the frames and to the control of memory read and write operations, error detection and concealment, are preferably realised as software processes executed by a microprocessor included in the receiver. The drawing up of such software processes and their coding into instructions executable by the processor are as such known to one skilled in the art.

The invention provides an extensive and reliable method and equipment for detecting transmission errors in a digital audio signal and for concealing errors detected. Writing of frames to memory and reading them in parts determined by a window of a certain size are computationally not unreasonably demanding operations, so the invention is applicable to series production of digital audio receivers at a cost level required for consumer electronics. The exemplary embodiments described above do not confine the invention but it can be modified within the limits defined by the claims set forth below.

What is claimed is:

1. A method for detecting and concealing errors in a digital audio receiver which processes coded digital audio signals in frames of predetermined shape, comprising the steps of:

storing several successive frames in memory, selecting one frame stored in memory as the current frame, examining the current frame for errors, concealing errors detected in the current frame using values obtained from the corresponding parts of other corrected or correctly received frames preceding or succeeding the current frame in the window, and wherein decoding and concealing are performed by the steps of:

storing the last received frame undecoded whereafter it is decoded, decoding in the first stage a first part of the frame to be decoded, examining in the second stage whether the part of the current frame that correspond to said first part contains errors, said current frame being different than said frame to be decoded, decoding in the third stage a second part of the frame to be decoded, and examining in the fourth stage whether the part of the current frame that corresponds to said second part contains errors.

2. The method of claim 1, wherein a certain read window is employed to read stored frames from memory, the size of the read window being a certain non-zero integer number of frames.

3. The method of claim 2, wherein the size of said memory is NFRMS frames, where NFRMS is a positive integer, and the size of said read window is cnnxt-cnpre+1 frames, where cnnxt and cnpre satisfy the double inequality 0≦(cnpre+cnnxt)<NFRMS, so that said read window contains cnpre frames that have been received before the current frame, and cnnxt frames that have been received after the current frame.

4. The method of claim 1, wherein said frames are DAB audio frames according to the ETS 300 401 standard.

5. The method of claim 4, wherein the latest received frame is stored undecoded whereafter it is decoded in stages comprising the steps of:
in the first stage, decoding the beginning of the frame to be decoded up to the scale factors,
in the second stage, examining whether the scale factors of the current frame contain errors,
in the third stage, dequantizing the part of the frame to be decoded that contains audio samples into unscaled audio samples, and
in the fourth stage, examining whether the unscaled audio samples in the current frame contain errors.

6. The method of claim 5, further comprising the step of scaling the audio samples of the current frame using the scale factors of the current frame after it has been examined and determined whether the unscaled audio samples of the current frame contain errors and errors detected have been concealed.

7. The method of claim 4, further comprising the step of interpreting the current frame as wholly erroneous if any one of the following conditions is met:
the first checksum following the header of the frame is not in accord with the contents of its coverage area,
the contents of the field indicating bit rate are "0000" or "1111",
the contents of the field indicating sampling frequency are "00" or "10",
the value of the padding indicator bit is "1",
the contents of the field indicating bit rate are "0001", "0010", "0011" or "0101" while at the same time the ID bit is "1" and the contents of the field indicating sampling frequency are "01" and the contents of the field indicating mode are "00", "01" or "10",
the contents of the field indicating bit rate are "1011", "1100", "1110" while at the same time the ID bit is "1" and the contents of the field indicating sampling frequency are "01" and the contents of the field indicating mode are "11",
the contents of the field indicating emphasis are "01", "10" or "11",
the information conveyed by the field indicating bit rate and the number of reserved bits contradict each other,
the value of the field indicating bit rate is different from that of the previous frame without the receiver having advance knowledge of the bit rate change,
the value of the field indicating sampling frequency is different from that of the previous frame without the receiver having advance knowledge of the sampling frequency change,
the value of the field indicating mode is different from that of the previous frame without the receiver having advance knowledge of the mode change and the change does not indicate a transition between the "stereo" and "joint stereo" modes,
the value of the ID bit is different from that of the previous frame without the receiver having advance knowledge of the ID bit change.

8. The method of claim 7, further comprising the steps of making an attempt to replace the sample values carried by a frame interpreted wholly erroneous with error-free substitute values from a frame which is temporally as close to the current frame as possible, and if no error-free substitute values are found closer than the distance equalling a predetermined number of frames, replacing the sample values of the frame interpreted erroneous by zero values.

9. The method of claim 4, further comprising the step of interpreting the current frame as partly erroneous if any one of the following conditions is met:
a checksum in the second checksum field at the end part of the frame is not in accord with the contents of its coverage area,
an index value indicating scale factor is "111111".

10. The method of claim 9, further comprising the steps of making an attempt to replace the values interpreted erroneous in a frame interpreted partly erroneous with error-free substitute values from a frame which is temporally as close to the current frame as possible, and if no error-free substitute values are found closer than the distance equalling a predetermined number of frames, replacing the sample values interpreted erroneous by zero values.

11. A decoding apparatus for decoding a coded digital audio signal in frame format and for detecting and concealing errors in said digital audio signal, comprising:
an input port and output port having connected between them in series,
a frame decoding block for preprocessing frames of digital audio signal,
a reconstructing block for performing the decoding process proper, and
an inverse filtering block for converting the decoded signal into a form directed to the output port,
and wherein said reconstructing block comprises:
a table for the temporary storing of frames,
read and write means for writing frames to said table and reading them from it in windows,
means for decoding a first part of certain frame to be decoded included in a window read and examining the correctness of a corresponding decoded first part of a certain current frame included in the window read, said current frame being different than said frame to be decoded, before proceeding to decode a second part of said frame to be decoded, and
means for replacing the values detected erroneous in the decoded part of the current frame using values obtained from the corresponding parts of other corrected or correctly received frames preceding or succeeding the current frame in the window.

12. The decoding apparatus of claim 11, further comprising means for limiting a signal in the form directable to the output port such that it conforms to predetermined limit values.

13. The decoding apparatus of claim 12, further comprising means for maintaining an estimate for a signal's bit error ratio and for controlling error concealment operation on the basis of the current estimate for the bit error ratio.

14. The decoding apparatus of claim 13, further comprising means arranged so as to mute a signal part in the form directable to the output port, obtained from a certain frame, if it as such would cause need in excess of a certain threshold value to limit the signal so as to conform to limit values, said threshold value depending on the current estimate for the bit error ratio.

15. A method for detecting and concealing errors in a digital audio receiver which processes coded digital audio signals in frames that comprise a header part, a bit allocation data part, a scalefactor selection information part, a scalefactor data part and a samples part, the method comprising the steps of:

storing several successive frames in memory;

selecting one frame stored in memory as the current frame;

examining the current frame for errors;

concealing errors detected in the current frame using values obtained from the corresponding parts of other corrected or correctly received frames preceding or succeeding the current frame in the window; and wherein decoding and concealing are performed by the steps of:

storing the last received frame undecoded whereafter a frame received before said latest received frame is decoded;

decoding in a first stage the scalefactor data part of the frame to be decoded;

examining in a second stage whether the scalefactor data part of the current frame contains errors;

decoding in a third stage the samples part of the frame to be decoded; and examining in a fourth stage whether the samples of the current frame contains errors.

16. A decoding apparatus for decoding a coded digital audio signal in frame format that comprises in each frame a header part, a bit allocation data part, a scalefactor selection information part, a scalefactor data part and a samples part and for detecting and concealing errors in said digital audio signal, comprising:

an input port and output port having connected between them in series;

a frame decoding block for preprocessing frames of digital audio signal;

a reconstructing block for performing the decoding process proper; and an inverse filtering block for converting the decoded signal into a form directed to the output port;

and wherein said reconstructing block comprises:

a table for the temporary storing of frames;

read and write means for writing frames to said table and reading them from it in windows;

means for decoding the scalefactor data part of a certain frame to be decoded, which is a frame received before the latest received frame and included in a window read, and for examining the correctness of the decoded scalefactor data part of a certain current frame included in the window read, before proceeding to decode the samples part of said frame to be decoded, and means for replacing the values detected erroneous in the decoded part of the current frame using values obtained from the corresponding parts of other corrected or correctly received frames preceding or succeeding the current frame in the window.

* * * * *